May 30, 1933.

A. D. PENTZ 1,912,218

HYDRAULIC BRAKE ACTUATING UNIT

Filed July 17, 1930 2 Sheets-Sheet 1

Inventor
A. D. Pentz
Attorneys
Cooper, Kerr & Dunham

May 30, 1933.  A. D. PENTZ  1,912,218
HYDRAULIC BRAKE ACTUATING UNIT
Filed July 17, 1930  2 Sheets-Sheet 2
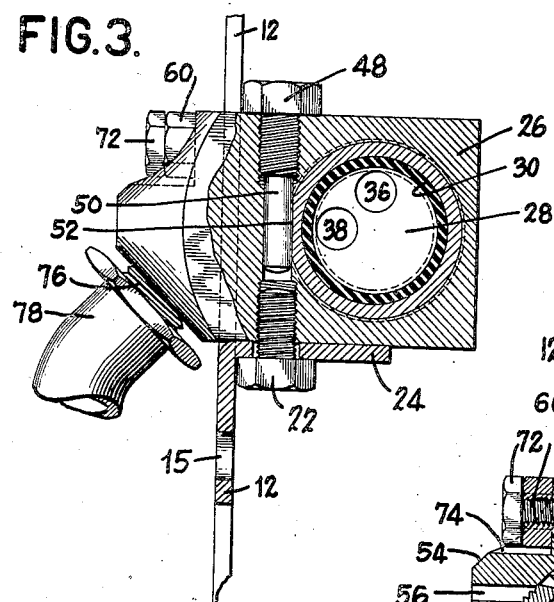
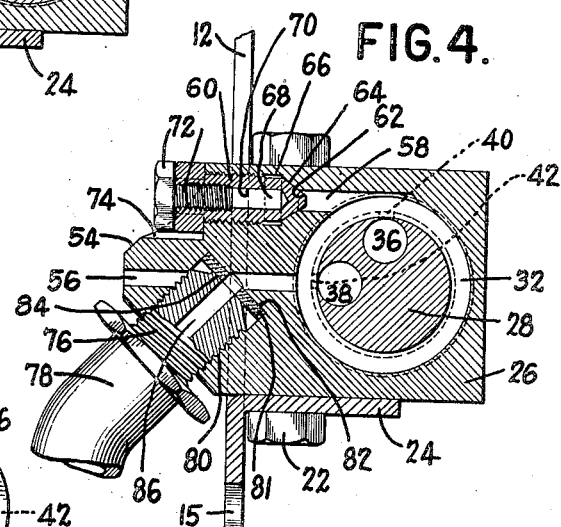
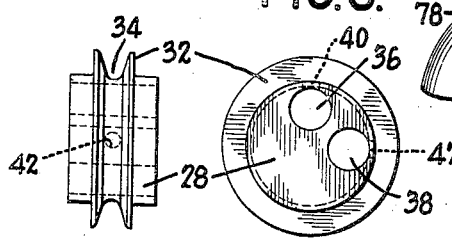
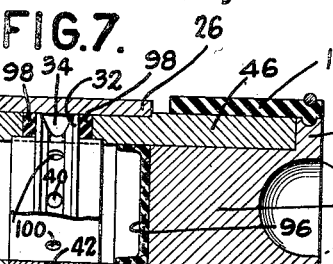
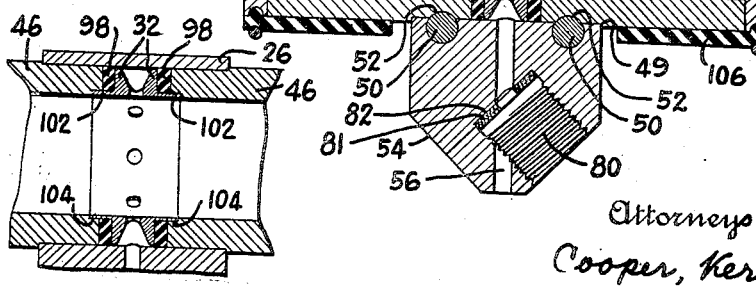
Inventor
A. D. Pentz
Attorneys
Cooper, Kerr & Dunham Patented May 30, 1933

1,912,218

UNITED STATES PATENT OFFICE

ALBERT D. PENTZ, OF NEW YORK, N. Y., ASSIGNOR TO PENTZ MOTOR BRAKE CORPORATION, OF NEW YORK, N. Y., A CORPORATION OF NEW YORK

HYDRAULIC BRAKE ACTUATING UNIT

Application filed July 17, 1930. Serial No. 468,621.

This invention pertains to fluid pressure brakes for vehicles, with particular reference to an improved form of actuating unit therefor.

Among the objects of the invention are the disclosure of an actuating device readily adaptable for use on any brake of a vehicle whether front, rear, right side or left side; a device which is simple in design, easily kept in repair, easily replaced, and which lends itself readily for use with conventional cup-leather plungers or with hermetically sealed resilient expansible members.

Further and other objects and advantages will be apparent from the specification and drawings, the latter illustrating what is now considered the preferred form of the invention.

Fig. 1 is a side view of a brake, showing the present invention in home position, the brake drum being shown in cross-section.

Fig. 2 is a cross section on the line 2—2 of Fig. 1.

Fig. 3 is a cross-section on the line 3—3 of Fig. 1.

Fig. 4 is a cross-section on line 4—4 of Fig. 1.

Figs. 5 and 6 are side and end views of the central sealing bushing.

Fig. 7 is a view similar to Fig. 2 but with conventional plungers instead of the rubber members of Fig. 2.

Fig. 8 is an optional detail of Fig. 7.

In the drawings 10 is a brake drum designed for attachment to a vehicle wheel, while 12 is the stationary apron arranged for attachment by bolts 14 through bolt holes 15 (see Figs. 3 and 4) to the axle housing or other non-rotative part of the vehicle. Within the drum is the brakeband, which may be of any desired type, but is here shown as two shoes 16, hinged together by pin 18 and shod with friction material 20. Between the upper ends of shoes 16 is the hydraulic actuating device designated generally as "A", and mounted by screws 22 on a shelf 24 formed integral with apron 12 as may clearly be seen in Figs. 3 and 4.

In Figs. 2, 3 and 4 are shown details of the preferred form of actuating unit "A". It comprises a body member 26, bored to receive a floating sealing bushing 28, and a pair of hat-shaped resilient members 30, one at each end of ring 28. As may be seen in Figs. 5 and 6, bushing 28 is provided about its mid-portion with a protruding circumferential ring 32 having cut into its outer surface a circumferential groove 34. Bored lengthwise through bushing 28 are two holes 36 and 38, connected to groove 34 by radial holes 40 and 42, respectively.

The device is assembled by placing bushing 28 in the bore of body 26, slipping the members 30 into place with their rims 44 surrounding bushing 28 against opposite sides of ring 32, and then inserting sleeves 46 around member 30 and applying pressure until circumferential shoulders 49 on the sleeves 46 abut body 26, thus insuring a predetermined amount of compression of rims 44. Sleeves 46 also automatically position bushing 28 and members 30, and equalize the compression on rims 44. This compression is sufficient to insure a fluid-tight joint between bushing 28, ring 32, body 26, and sleeves 46, without being sufficient to damage the rubber rim 44. It will be noted that in the present construction the bushing 28 is balanced very effectively between the rims 44 so that when both sleeves 46 have been placed in position and locked, as will be hereinafter described, any pressure on one side greater than that on the other side will be equalized because the bushing is capable of assuming a central position and is, therefore, free of the casing 26 and may be said to be floating. The cylindrical outer surface of bushing 28 prevents the compressed rim 44 from becoming deformed by bulging inwardly and therefore aids in securing a tight and permanent joint. When sleeves 46 have reached the above described position, screws 48 are screwed downwardly into body 26 (Figs. 2, 3 and 7) until their unthreaded stems 50 enter grooves 52 in the sleeves, thereby locking the sleeves in operative position. Under certain conditions screws 22 may be provided with an unthreaded portion such as 50, and screws 48 may thus be eliminated.

The portion of body 26 which projects horizontally outwardly from the drum beyond apron 12, is in the form of a cone 54, and has an axial fluid-supply hole 56 bored therethrough, the inner end of which registers with grooves 34 of bushing 28. Hole 42 of the bushing is in alignment with hole 56, and hole 40 is at the top of the bushing, as may best be seen in Fig. 4.

An air bleeder hole or passage 58 is drilled above hole 56 and parallel thereto so as to connect with groove 34 at its highest point. This passage is normally closed by a bleeder valve 60 having a conical face 62 seating on a conical seat 64. When valve 60 is off its seat, fluid may pass from the interior of the unit through holes 36, at the highest point in bushing 28, 34, 40, 58, clearance space 66, through holes 68 into the passage 70 within valve 60. From this passage fluid may pass to the atmosphere when screw 72 is removed.

Conical surface 54 is recessed as at 74 to accommodate the heads of valve 60 and screw 72. Otherwise, surface 54 is unbroken and may be drilled and tapped as at 80 at any desired angle, to receive the threaded fitting 76 of hose 78. Preferably the axis of hole 80 should intersect the axis of passage 56. The bottom 82 of hole 80, and the end 84 of hose coupling 76, are faced so that when coupling 76 bottoms in hole 80 a fluid tight joint is formed between the two surfaces. Packing 81 may be used between the surfaces if desired. Thus the inner end of passage 56 is connected to passage 86 through the hose coupling, while the outer end of passage 56 is shut off from the interior of the device. The above described arrangement permits the connection of hose 78 from almost any angle, without any change of the actuating unit except the angle of tapped hole 80, thus readily adapting the device for use at any wheel of the vehicle.

A piston 83 is placed in the open end of each sleeve 46, each piston being counterbored at its free end to receive a thrust ball 85, which may, if desired, be held in position by a cross pin 87 to prevent the ball falling out of its recess when the unit is handled.

In operative position device "A" is mounted (Fig. 1) on shelf 24 with thrust balls 85 in contact with thrust blocks 88 fast on the ends of shoes 16. Then when fluid, usually oil or air, is forced through hose 78 and passages 86, 56, 42, 38 into the interiors of rubber members 30, those members expand longitudinally in sleeves 46, thereby forcing pistons 83 outwardly and, through the agency of balls 85 and blocks 88, causing the brakeshoes to engage the drum. When pressure within the device is relieved, retractor springs 90 and 92 withdraw the shoes to their inoperative positions against adjustable stops 94, and return plungers to home positions, all in the well known manner.

To bleed air from the unit, valve 60 is loosened and screw 72 removed, whereupon air will pass through passages 36, 40, groove 34, passage 58 and so to the atmosphere as previously described.

In the optional arrangement shown in Fig. 7, resilient members 30 and pistons 83 are replaced by pistons 95 equipped with cup leathers 96. Ring 32 is retained, but the body of bushing 28 is not used. Packing 98 between ring 32 and the ends of sleeves 46 serves to prevent leakage of fluid. As shown, ring 32 is provided with extra holes 100 into groove 34 in addition to holes 40 and 42 previously described. Absence of the body portion of bushing 28 permits a longer piston stroke than in the model first described.

An optional arrangement of Fig. 7 is shown in Fig. 8, in which ring 32 has flanges 102 which serve the same purpose as the body portion of bushing 28 in Fig. 2, in restraining packing 98 when it is compressed by sleeve 46. The inner ends of sleeves 46 are notched as at 104 to accommodate flanges 102, and the inner diameter of flanges 102 is the same as that of sleeves 46 so that leather cups 96 may pass within flanges 102 if necessary.

It is desirable to limit the inward travel of pistons 83 and 95 by flanges 105 adapted to contact with the outer ends of sleeves 46 as shown in Fig. 7, and it is also advisable to provide a rubber boot 106 slidable about sleeve 46 and attached to flange 104 in order to exclude dirt and enclose lubricant.

It is to be understood that the invention is not limited to the specific embodiment herein illustrated and described but may be used in other ways without departure from its spirit as defined by the following claims.

I claim—

1. An hydraulic brake actuating device comprising in combination, a body member having a cylindrical bore therethrough, annular sleeves fitted into opposite ends of said bore, a piston slidable in each of said sleeves, a pair of cup shaped expansible members between said pistons, and a floating bushing between said expansible members, said floating bushing and said sleeves cooperating to engage the rims of said members with equal pressure to form fluid tight joints therearound.

2. An hydraulic brake actuating device comprising in combination, a body member having a cylindrical bore therethrough, annular sleeves fitted into opposite ends of said bore, a piston slidable in each of said sleeves, a pair of cup shaped expansible members between said pistons, said expansible members having flanged rims, and a floating bushing between said expansible members, said bushing and said sleeves cooperating to engage the rims of said members with equal pressure to form fluid tight joints therearound.

3. The invention set forth in claim 2 in which means is provided for limiting the depth of insertion of said sleeves into said body member, whereby spaces of predetermined dimensions are provided for said rims between said sleeves and said bushing, for the purpose set forth.

4. The invention set forth in claim 2 in which said bushing has a cylindrical portion adapted to enter the interior of each cup-shaped member to prevent inward deformation of said members when the rims are compressed between said bushing and said sleeves.

5. An hydraulic brake actuating device comprising in combination, a body member having a cylindrical bore therethrough, a bushing slidable in said bore, a cup shaped expansible member on each side of said bushing having a flange, means for engaging the flanges of said expansible members with equal pressure to produce liquid-tight engagement with said bushing, and means for admitting fluid through said bushing into said cup-shaped members whereby said members may be expanded longitudinally of said bore.

6. The invention set forth in claim 5 in which said bushing is provided with a circumferential groove with outlets therefrom into said cup-members, and said body member has a passage through which fluid may be supplied to the interior of said cup members by way of said groove and said outlets.

7. The invention set forth in claim 5 in which a passage is provided from the highest part of said bushing to the interior of said cup members, and an outlet from said passage is provided through said body member, and a valve for opening said outlet to allow entrapped air to escape therethrough.

8. An hydraulic brake actuating device comprising in combination, a body member having a cylindrical bore therethrough to accommodate the movable parts of said device, a lateral passage from said bore through said body member to atmosphere, and a second passage through said body member intersecting said first passage and adapted to receive a hose fitting, said fitting serving the double purpose of sealing the inner end of said first mentioned passage from the atmosphere and of providing an inlet for fluid to the bore of the body member through said second passage and the inner portion of said first passage.

9. The invention set forth in claim 8 in which the sealing means comprises a faced surface at the inner end of said second passage, and a cooperating faced surface on the end of said fitting whereby a fluid tight joint may be provided therebetween.

10. A hydraulic brake actuating device comprising in combination, an elongated body member, having one end thereof conical in shape, a cylindrical bore through the other end of said body member, an axial passage through the conical portion of said body to connect said bore to atmosphere, a passage from the conical surface of said body member intersecting said axial passage, and a hose fitting entered in the second mentioned passage and closing the end of the axial passage from atmosphere whereby a passage for fluid is provided through said fitting and the inner end of the axial passage into the cylindrical bore.

11. A hydraulic brake actuating device comprising a body member having a cylindrical bore therethrough, sleeves fitted into opposite ends of said bore, a piston slidable in each of said sleeves, expansible diaphragm members between said pistons and a floating bushing held in balanced relation between said diaphragm members by said sleeves and in fluid-tight relationship with the diaphragm members.

In testimony whereof I hereto affix my signature.

ALBERT D. PENTZ.